(12) United States Patent
Holly (10) Patent No.: US 12,041,888 B2
(45) Date of Patent: Jul. 23, 2024

(54) TOOL-FREE INDEXABLE TOOTH WITH HERMETIC SPRING

(71) Applicant: Green Manufacturing, Inc., Morenci, MI (US)

(72) Inventor: Brian P. Holly, Onsted, MI (US)

(73) Assignee: Green Manufacturing, Inc., Morenci, MI (US)

( * ) Notice: Subject to any disclaimer, the term of this patent is extended or adjusted under 35 U.S.C. 154(b) by 382 days.

(21) Appl. No.: 17/634,163

(22) PCT Filed: Sep. 8, 2020

(86) PCT No.: PCT/US2020/049636
§ 371 (c)(1),
(2) Date: Feb. 9, 2022

(87) PCT Pub. No.: WO2021/050403
PCT Pub. Date: Mar. 18, 2021

(65) Prior Publication Data
US 2022/0287252 A1 Sep. 15, 2022

Related U.S. Application Data

(60) Provisional application No. 62/897,588, filed on Sep. 9, 2019.

(51) Int. Cl.
*A01G 23/06* (2006.01)
*B27G 13/10* (2006.01)

(52) U.S. Cl.
CPC .......... *A01G 23/067* (2013.01); *B27G 13/10* (2013.01)

(58) Field of Classification Search
CPC ...... A01G 23/067; B27G 13/02; B27G 13/04; B27G 13/08; B27G 13/10
See application file for complete search history.

(56) References Cited

U.S. PATENT DOCUMENTS

| | | |
|---|---|---|
| 2,996,291 A | 8/1961 | Krekeler |
| 4,019,550 A | 4/1977 | DeHaitre |
| 4,349,232 A | 9/1982 | Braun et al. |
| 4,827,995 A | 5/1989 | Wilson |
| 4,932,295 A | 6/1990 | Erickson |
| 5,018,793 A | 5/1991 | Besten |
| 5,605,382 A | 2/1997 | Massa |
| 5,743,314 A | 4/1998 | Puch |

(Continued)

*Primary Examiner* — Matthew Katcoff
(74) *Attorney, Agent, or Firm* — Endurance Law Group PLC (57) ABSTRACT

A tree stump grinding wheel assembly includes a rotor having a plurality of holders distributed about its cutting periphery. Each holder has a neck in which resides a socket adapted to receive the shank of an indexable tooth. A head is attached to one end of the shank and screw threads are formed in its other end. The head has a plurality of flats configured to sequentially register with a forward shoulder on the neck. A hermetic spring is operatively disposed on the shank between a rearward face of the socket and a retention nut. The hermetic spring is made of elastomeric material and has a tapered nose that self-seats in a countersink at the rearward opening of the socket. The hermetic spring has an accordion-like bellows section. The bellows section can have a central annular bulge.

17 Claims, 9 Drawing Sheets

(56) References Cited

U.S. PATENT DOCUMENTS

| | | |
|---|---|---|
| 6,546,977 B1 * | 4/2003 | Monyak ............... A01G 23/067 |
| | | 299/79.1 |
| 6,623,084 B1 | 9/2003 | Wasyleczko |
| 7,343,947 B1 | 3/2008 | Sollami |
| 8,342,611 B2 | 1/2013 | Hall et al. |
| 9,551,217 B2 | 1/2017 | Ries et al. |
| 9,907,237 B2 | 3/2018 | Green et al. |
| 10,021,839 B2 | 7/2018 | Leonardi et al. |
| 10,219,450 B2 * | 3/2019 | Green ..................... B23C 5/202 |
| 10,219,451 B2 | 3/2019 | Green et al. |
| 11,071,258 B2 | 7/2021 | Leonardi et al. |
| 2008/0237379 A1 | 10/2008 | Briggs et al. |

* cited by examiner

TOOL-FREE INDEXABLE TOOTH WITH HERMETIC SPRING

CROSS REFERENCE TO RELATED APPLICATIONS

This application claims priority to Provisional Patent Application 62/897,588 filed on Sep. 9, 2019.

BACKGROUND OF THE INVENTION

Field of the Invention. The present invention relates generally to a stump cutting apparatus and, more specifically, to an indexable replaceable cutting tip for a stump grinding machine.

Description of Related Art. A typical stump grinder includes a plurality of cutting teeth mounted around the cutting periphery of a cutting wheel or rotor. Individual teeth on the rotor chip or grind away the stump. Tool holders, sometimes referred to as pockets or mounting blocks, secure the teeth to the cutting wheel. Each tooth may include a cutting tip or bit made of a solid material such as tungsten carbide and a generally cylindrical shank that extends through a socket in the holder.

Since stump grinders operate in harsh environments, maintenance of the teeth is or can be frequent. For example, contact with dense tree wood and the underlying ground surface will rapidly dull an outer portion of the cutting edge of each tooth. And when a tooth strikes something hard such as an embedded stone, the cutting edge may break or chip requiring immediate attention. Finally, continuous loading of the teeth can cause tooth failures, including twisting or bending of their shanks. Maintaining a sharp, serviceable edge on each tooth has traditionally been a tedious and time-consuming task for those engaged in operating and servicing stump grinding equipment.

U.S. Pat. No. 9,241,448, issued Jan. 26, 2016, discloses an indexable tooth that can be selectively rotated between several (e.g., three) positions without removing the tooth from the socket of its tool holder. Each incremental rotation presents a fresh sharp edge. According to U.S. Pat. No. 9,241,448, the indexable tooth includes a head having a front surface and a rear surface. A cutting tip is attached to the front surface of the head. The cutting tip is generally cylindrical in shape and the front surface thereof has a generally concave shape which terminates prior to the periphery of the cutting tip. The front surface of the head may include a shallow depression or indentation sized to receive a corresponding projection extending outward from the rear surface of the cutting tip. The complementary indentation and projection are such that the projection functions to properly locate and orient the cutting tip, typically made of a hard material such as carbide, on the head prior to attaching the cutting tip to the head through one of several known processes including brazing. As illustrated in the drawings, the head has a generally cylindrical shape that tapers rearwardly from the front surface toward the rear surface. A plurality of planar indentations or flats are located about the outer circumferential surface of the head. The planar indentations are spaced from one another a predetermined amount, illustrated as 120°. When the planar indentations located on the head matingly engage the planar or flat surface of the shoulder located on the neck they cooperate with the shoulder to resist rotation of a tooth about its longitudinal axis. The multiple planar indentations located on the head of the tooth make the tooth indexable.

U.S. Pat. No. 9,241,448 goes on to explain that, after disengaging one of the planar indentations from the shoulder, the tooth can be rotated or indexed such that an adjacent indentation on the head engages the shoulder located on the neck. Accordingly, indexing the tooth in this manner exposes a new portion of the outer peripheral or cutting edge of the cutting tip. Thus, the planar indentations and shoulder cooperate to secure the orientation of the tooth with respect to its longitudinal axis while enabling a new portion of the cutting edge to be exposed thereby providing a means to more efficiently use the entire portion of the cutting tip and corresponding cutting edge. While the indentations are disclosed herein as being planar, they may also have other configurations including arcuate or angular projections provided that the shoulder located on the tool portion of the tool holder has a complementary configuration and cooperates with the configuration on the tooth to prevent rotation of the tooth about its longitudinal axis.

U.S. Pat. No. 9,241,448 describes use of the indexable tooth as follows: In order to index the tooth, applying a force to the distal end of the shank, for example by tapping on the distal end with a hammer or mallet, moves the tooth longitudinally in the aperture and correspondingly disengages the flat from the shoulder. Once disengaged the tooth, specifically the shank, rotates freely within the aperture. Accordingly, the tooth can be rotated about its longitudinal axis until a different flat is placed adjacent the shoulder. The tooth is then reinserted by driving it in the opposite direction until the newly selected flat is placed adjacent the shoulder. When necessary, the tooth can be fully removed from the tool holder by inserting a tool having a diameter lesser than that of the aperture in the boss. The tooth is then driven out of the aperture by applying a suitable force to the flat surface of the distal end of the shank.

While the example of U.S. Pat. No. 9,241,448 has faithfully served the forestry community for many years, there is a continuing desire to reduce and further facilitate routine maintenance operations like indexing the teeth.

BRIEF SUMMARY OF THE INVENTION

According to a first aspect of the invention, an indexable cutting tooth assembly is provided for tree stump grinding. The assembly comprises a shank having first and second ends. A head is attached to the first end of the shank. The head includes a cutting tip. A retainer is operatively secured onto the second end of the shank. The invention comprises a hermetic spring operatively disposed on the shank between the retainer and the head. The hermetic spring is fabricated from an elastomeric material.

According to a second aspect of the invention, an indexable tooth and holder assembly are provided for a tree stump grinding wheel. The assembly comprises a holder having a base. A neck extends from the base. The neck has a distal end spaced from the base. The distal end includes a socket that extends cylindrically along a tooth axis. The socket has a forward opening and a rearward opening. The distal end of the neck has a forward face and a rearward face. The distal end of the neck has a forward shoulder associated with its forward face. An indexable tooth has a shank that is slidably received in the socket. The shank has first and second ends. A head is attached to the first end of the shank. When installed in an operational position, the head protrudes from the forward face of the socket and the second end of the shank protrudes from the rearward face. The head has at least one flat configured to register with the forward shoulder. The head includes a cutting tip. A retainer is operatively secured onto the second end of the shank. The improvement comprises a hermetic spring operatively disposed on the shank between the retainer and the rearward face of the of the socket.

According to a third aspect of the invention, a tree stump grinding wheel assembly is provided. The assembly includes a rotor having a cutting periphery. A plurality of holders are distributed about the cutting periphery of the rotor. Each holder has a base and a neck. The neck extends from the base toward a distal end. The distal end includes a socket that extends cylindrically along a tooth axis. The socket has a forward opening and a rearward opening. The distal end of the neck has a forward face and a rearward face. The forward face and the rearward face are disposed perpendicular to the tooth axis. The distal end of the neck also has a forward shoulder. An indexable tooth is disposed in each holder. The indexable tooth has a shank that is slidably received in the socket of the neck. The shank has first and second ends; a head is attached to the first end. When the indexable tooth is in an operational position, the head protrudes from the forward face of the socket and the second end protrudes from the rearward face of the socket. The head has at least one flat configured to register with the forward shoulder. The head includes a cutting tip. A retainer is operatively secured onto the second end of the shank. And a hermetic spring is operatively disposed on the shank between the retainer and the rearward face of the of the socket.

The hermetic spring is resistant to contamination from debris. The hermetic spring of this present invention greatly facilitates the indexing operation by both speeding its process and enabling tool-free servicing. The Applicant estimates that a person having ordinary skill in the art will be able to index a tooth in as little as 5-10 seconds. In comparison, the prior art requires on average at least 30-60 seconds to index a tooth and must be aided by a wrench. Considering that many grinding wheels have thirty or more teeth, the cumulative time savings enabled by the present invention are substantial. The fact that the tooth of this invention can be indexed without tools, means that indexing between planned maintenance cycles and in the field can be accomplished as needed. Moreover, the tooth of this invention can indexed using only one hand. In contrast, the prior art method of indexing teeth requires the use of two hands typically. Thus, the present invention is more user friendly, particularly with regard to a worker having an injured or possibly disabled hand.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
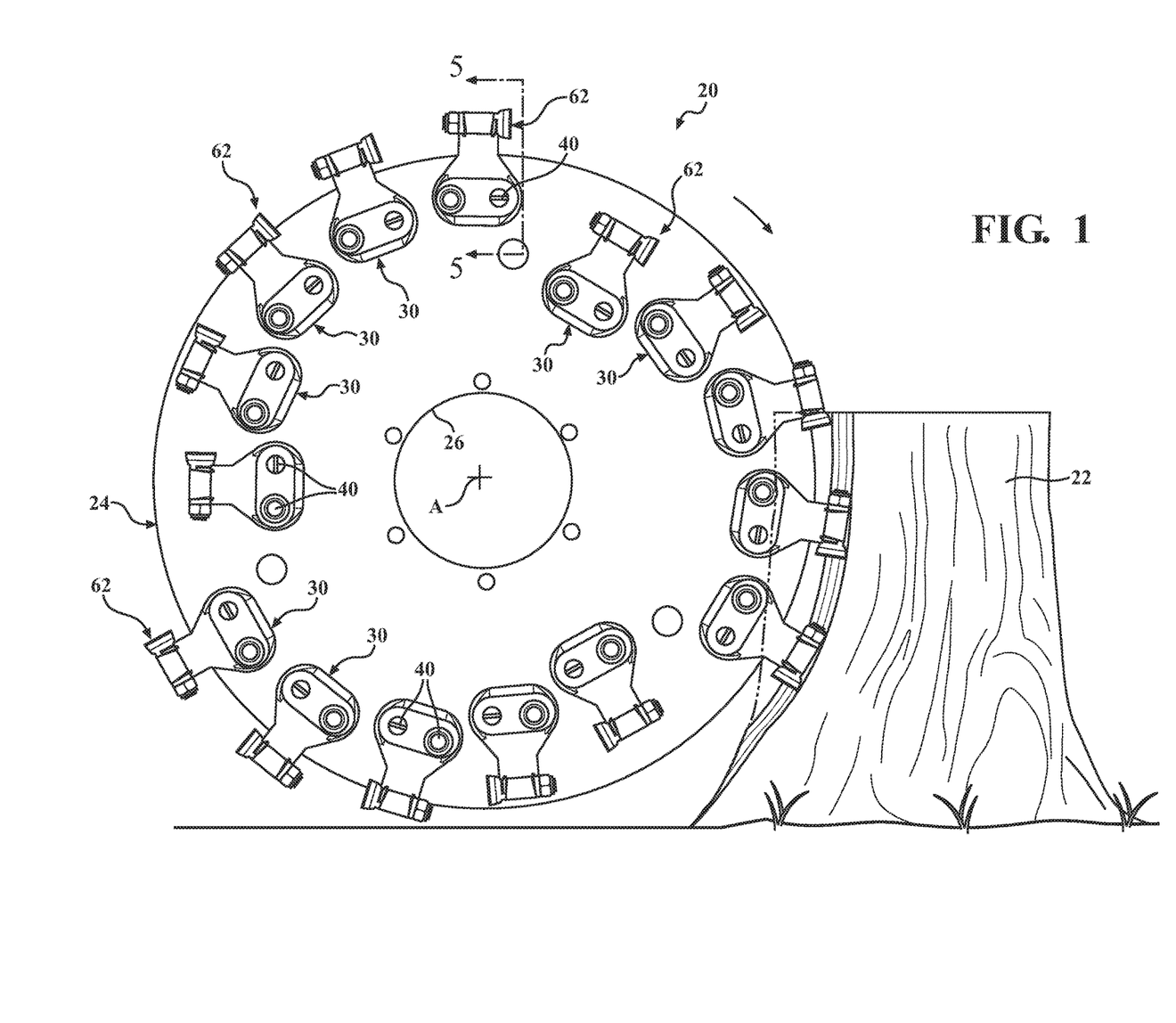
FIG. 1 is an environmental view showing a tree stump grinding wheel assembly according to an exemplary embodiment of the invention.

Referring to the figures, wherein like numerals indicate like or corresponding parts throughout the several views, a tree stump grinding wheel assembly is generally shown at 20 in FIG. 1. An illustrative tree stump 22 is depicted in partially removed condition.

The assembly 20 includes a rotor, generally indicated at 24. The rotor 24 has a hub 26 defining a central axis of rotation A. In the illustration, the hub 26 is a large hole centered on the central axis A and surrounded by six lug bolt holes. Naturally, the configuration of the hub 26 is intended to be configured to suit the machine to which it will be attached.

In the exemplary embodiment of FIG. 1, the rotor 24 is shown in the traditional form having a circular cutting periphery. Rotors 24 of this type are usually made of one-piece from heavy-gauge plate steel for durability and inertial mass. However, the rotor 24 can take other forms, including but not limited to two-bladed and four-bladed spoke types, as well as other suitable configurations. The four-bladed spoke type, for example, can be made in multiple pieces, such as the Quadwheel® rotor marketed worldwide by Green Manufacturing Inc., the Applicant of this present invention.

Figure 5:
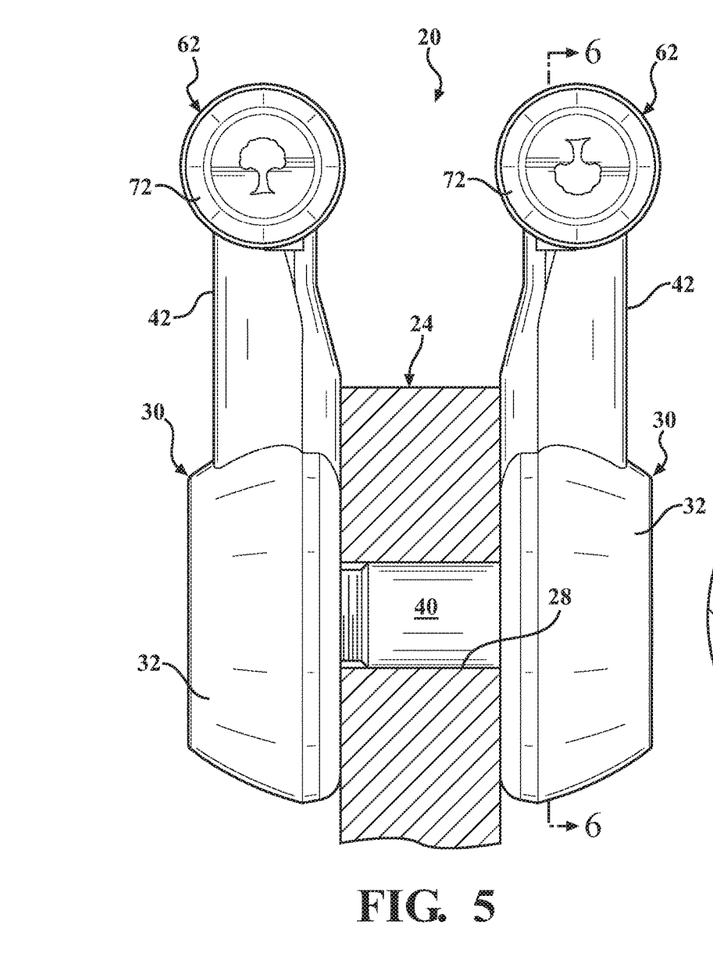
FIG. 5 is a cross-sectional view taken generally along lines 5-5 of FIG. 1.

Regardless of cutting periphery shape, the rotor 24 will have left and right sides as is well-known in the art. Only one side of the rotor 24 is visible from the perspective of FIG. 1, however both sides are apparent from the fragment of the rotor 24 appearing in FIG. 5. The central axis A passes perpendicularly through the left and right sides of the rotor 24 at the hub 26. A plurality of pocket holes 28 are disposed around the cutting periphery. In FIG. 5, the rotor 24 is shown sectioned through one of the pocket holes 28. From this view, it can be seen that the pocket holes 28 are through-holes opening into the left and right sides of the rotor 24. The pocket holes 28 are arranged in circumferentially-spaced pairs, for reasons which will be explained. For each pair, the center of the pocket hole 28 will be radially equidistant from the central axis A. However, the radial distance of one pair of pocket holes 28 may or may not be closer to or further from the central axis A than its adjacent neighboring paid of pocket holes 28. This latter detail can be discerned from FIG. 1, even though the pocket holes 28 are obscured from view.

The tree stump grinding wheel assembly 20 includes a plurality of holders, each generally indicated at 30. The plurality of holders 30 are distributed about the rotor 24 in any one of many strategic patterns as may be dictated by the application. In many applications, it is desirable to distribute one half of the plurality of holders 30 on the left side of the rotor 24 and the other half of the plurality of holders 30 on the right side of the rotor 24. However, this may not always be the case.

Figure 2:
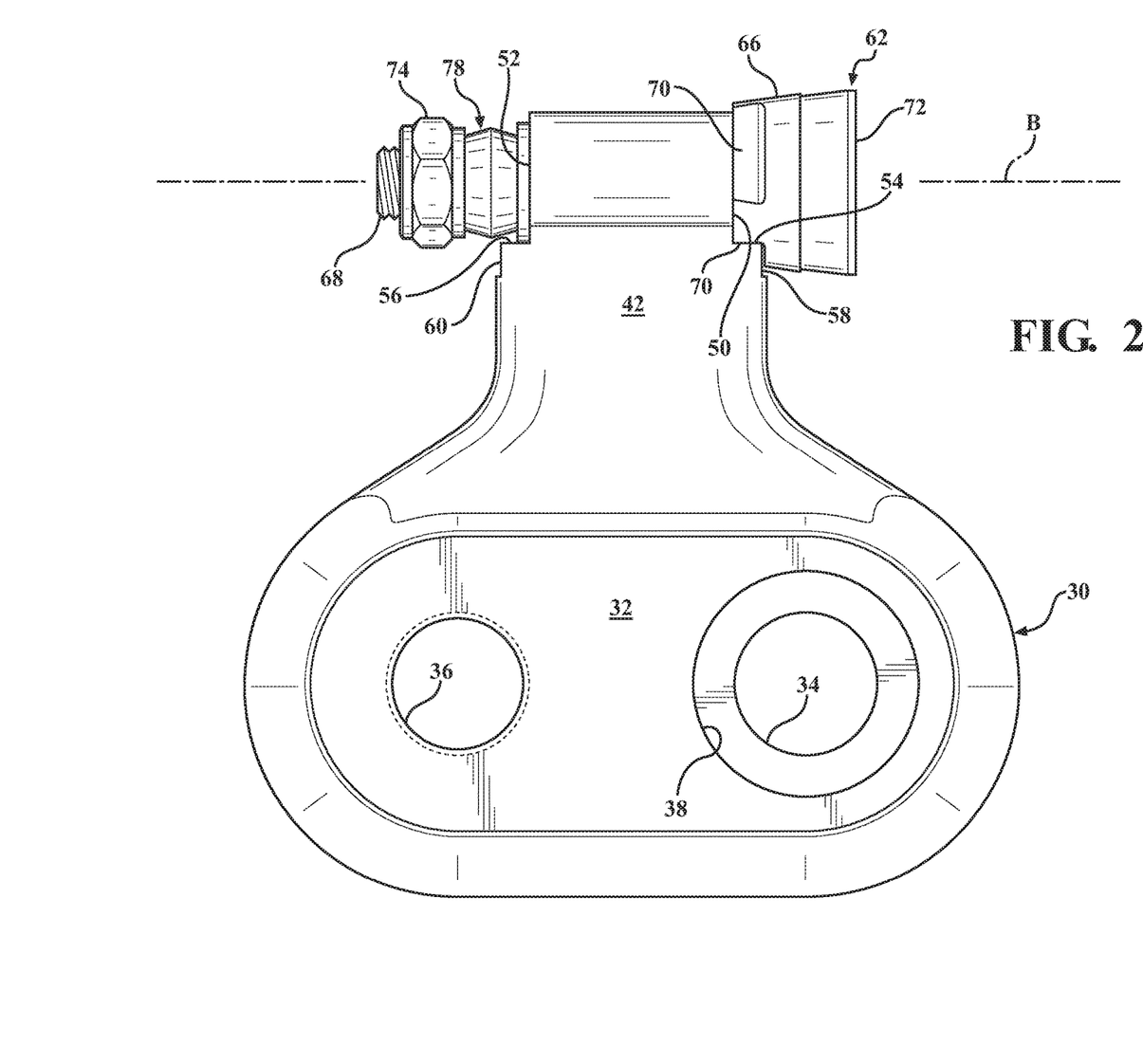
FIG. 2 is a side elevation view of a combination holder and indexable tooth according to an embodiment of the invention.
Figure 3:
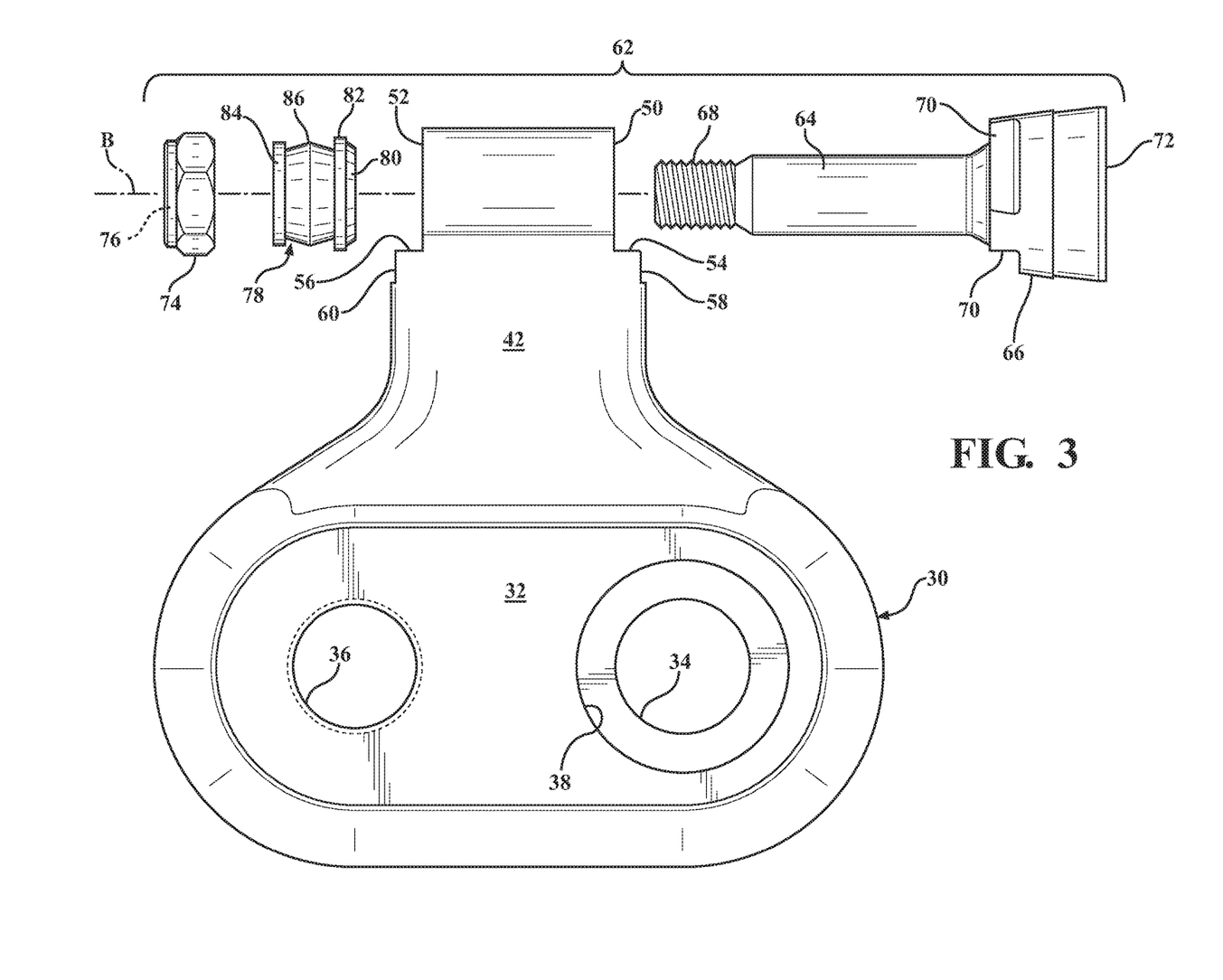
FIG. 3 is an exploded view of the combination holder and indexable tooth of FIG. 2.
Figure 6:
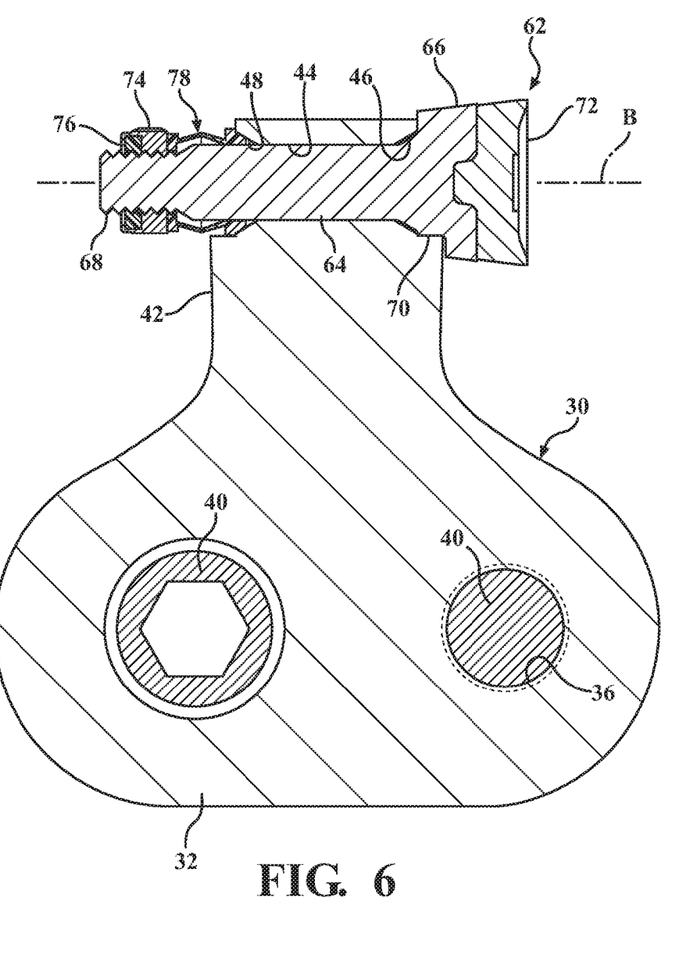
FIG. 6 is cross-sectional view taken generally along lines 6-6 of FIG. 5.

Each holder 30 has a base 32, which provides a solid foundation for attachment to the rotor 24. The base 32 has an inside surface and an outside surface. The inside surface of the base 32 is adapted to directly engage either the left side or the right side of the base 32, as best seen in FIG. 5. Each base 32 has a pass-through hole 34 and a threaded hole 36. The pass-through hole 34 may be configured with a counterbore 38 in the outside surface of the base 32, via which the head of a mounting bolt 40 can be recessed. In FIGS. 2 and 3, the pass-through hole 34 is stationed on the left and the threaded hole 36 is stationed to the right when viewed toward the outside surface. However, this arrangement can be switched so that the pass-through hole 34 is on the right and the threaded hole 36 is on the left, as depicted in FIGS. 1 and 5-6. In still further contemplated embodiments, the base can be fitted with pass-through holes 34 or alternatively two threaded holes 36.

For each holder 30, the pass-through hole 34 and threaded hole 36 are adapted to align with one pair of pocket holes 28 in the rotor 24. In many installations, two holders 30 will be disposed, respectively, on the left and right sides of the rotor 24 and aligned with a common pair of pocket holes 28 as illustrated in FIG. 5. Mounting bolts 40 are installed through the pass-through hole 34 of a holder 30 on one side of the rotor 24, through the aligned pocket hole 28, and screwed turned into the threaded hole 36 on the opposing holder 30. With both mounting bolts 40 tightened, the two opposing holders 30 sandwich the rotor 24, creating a secure and easily serviceable connection. Although not shown, a lock washer or other anti-rotation feature can be included to reduce the risk that the mounting bolts 40 will unexpected work themselves loose in operation.

Each holder 30 includes a neck 42 extending from the base 32. The neck 42 can take various shapes, depending largely on the application and other factors. In some cases, the neck 42 will extend nearly radially from the base 32, as suggested in FIGS. 4 and 5. In other cases, the neck 42 will be canted or offset from the base 32. Many neck 42 configurations are certainly possible. The neck 42 has a distal end spaced from the base 32, in which a socket 44 is formed. The socket 44 extends more or less cylindrically along a tooth axis B, which is generally perpendicular to the central axis of rotation A, but does not intersect the central axis A. The socket 44 has a forward opening 46 and a rearward opening 48. Each opening 46, 48 may (optionally) be formed with a countersink. That is, either or both of the forward 46 and rearward 48 openings may be conically widened such as is usually achieved with a reaming tool or other appropriately shaped cutter.

The distal end of the neck 42 has a forward face 50 and a rearward face 52. The forward face 50 and the rearward face 52 are each disposed perpendicular to the tooth axis B. The distal end of the neck 42 also includes a forward shoulder 54 and a rearward shoulder 56. The forward shoulder 54 perpendicularly adjoins the forward face 50 adjacent the forward opening 46 of the socket 44. And likewise, the rearward shoulder 56 perpendicularly adjoins the rearward face 52 adjacent the rearward opening 48 of the socket 44. The distal end of the neck 42 has a forward clearance notch and a rearward clearance notch. Thus, in the illustrated examples, the shoulders 54, 56 form ledge-like extensions projecting at right angles from the respective forward 50 and rearward 52 faces. Optionally, the neck 42 can include forward 58 and rearward 60 clearance notches. Each clearance notch 58, 60 is shown intersecting its respective shoulder 54, 56, however the size and location of a clearance notch, if any, can vary substantially based on the design particulars of the assembly 20.

Figure 4:
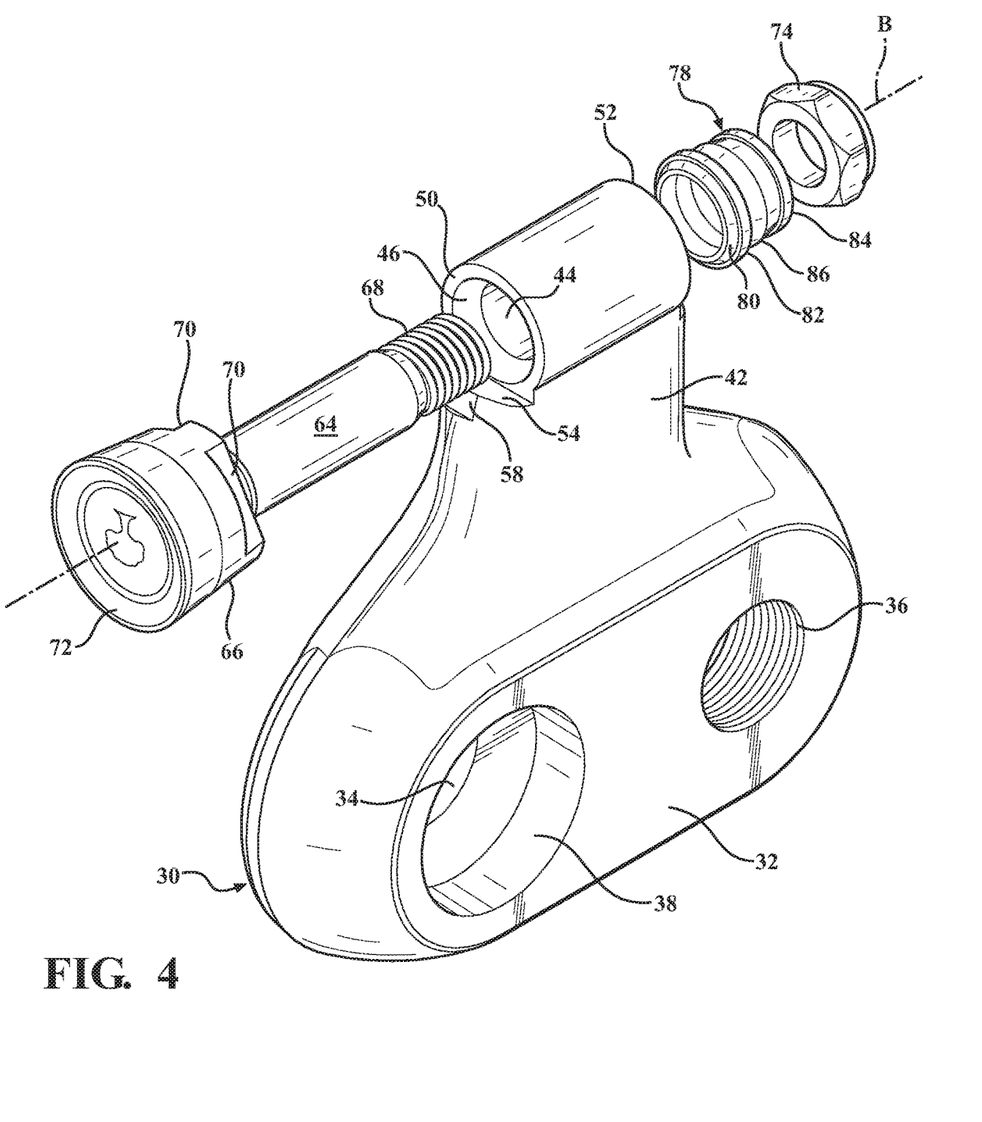
FIG. 4 is an exploded perspective view in which the holder is of an alternative design identifiable by a pass-through mounting hole on the left and a threaded mounting hole on the right.

An indexable tooth 62 is disposed in each holder 30. Each indexable tooth 62 has a shank 64 that is slidably received in the socket 44 in the distal end of the neck 42. In the example of FIGS. 3 and 4, the shank 64 is shown to be generally cylindrical to achieve a slip-fit inside the socket 44, however a circular cross-section is more convenience than necessity. The shank 64 extends between first and second ends. At the first end is located a head 66. A frustoconical interface may be provided at the first end of the shank 64, directly adjacent the head 66. In the illustrated examples, screw threads 68 are formed in the second end. In this embodiment, the indexable tooth 62 takes a bolt-like appearance.

The head 66 includes at least one flat 70. However, more commonly a plurality of flats 70 are provided. The flats 70 can take different forms. In the illustrated examples, the plurality consists of three flats 70 arranged in an equilateral triangular pattern, a characteristic of indexable teeth sold globally under the brand Greenteeth® by Green Manufacturing, Inc., the Applicant of this present invention. However, in other contemplated embodiments, the plurality could be four flats 70 arranged in a square pattern (as under the head of a carriage bolt), or the plurality could be six flats 70 arranged in a hex pattern, and so on with any number of flats. And in a still further contemplated example of equivalents, the head 66 includes only one flat 70, but the configuration of the shoulders 54, 56 is altered to enable indexing of the tooth 62. Moreover, many different indexing strategies may be devised with the same ultimate aim, which is to enable the indexable tooth 62 to be rotated in predetermined increments about the tooth axis B in order to refresh its cutting ability during routine serving.

Furthermore, the head 66 may be fitted with a hardened cutting tip 72. The cutting tip 72 may, for example, be fabricated from a carbide material or high-speed steel or other suitable composition. The cutting tip 72 can take many different forms in practice. In some cases, the cutting tip 72 can take a pointed or oblong shape. In the illustrated examples, however, the cutting tip 72 has a circular periphery and is dished (concave) along its face. Those of skill in the art will appreciate that many different shapes and styles of cutting tips 72 are possible.

Referring now to FIGS. 2-4 and 6-8, it can be seen that the indexable tooth 62 is installed into the holder 30 by inserting the second end of the shank 64 through the forward opening 46 in the socket 44. Ideally, but not necessarily, the holder 30 is designed to operate reversibly, in either direction, such that the forward and rearward designations are interchangeable. That is to say, excepting the pass-through 34 and threaded 36 holes, the holder 30 is mirrored about a vertical plane (dictated by tooth 62 direction.) In this manner, identical holders 30 can be placed back-to-back as in FIG. 5 and it will be understood that the forward features of one holder 30 are the rearward features of its neighbor, and vise-versa. The insertion of the indexable tooth 62 determines which features of the holder 30 are forward features, and which are rearward.

The indexable tooth 62 is fully inserted into the socket 44 so that the backside of the head 66 comes into contact with the forward face 50. The previously mentioned conical transition acts like a pilot by seating within the countersink of the forward opening 46 thus centering the head 66 along the tooth axis B. It can be seen from FIGS. 2, 6 and 7 that the head 66 protrudes from the forward face 50 of the socket 44, presenting the cutting tip 72 for stump grinding action. The indexable tooth 62 is prevented from rotating within the socket 44 by one of its flats 70 engaged by the forward clearance notch. That is, when the head 66 is pressed against the forward face 50, one of its flats 70 is seated alongside the forward shoulder 54, which inhibits rotation of the shank 64. The aforementioned forward clearance notch 58 accommodates the head 66 so that full and square engagement occurs at the forward face 50 rather than further down on the neck 42.

The length of the shank 64 is determined so that a portion of its second end protrudes from the rearward face 52 of the socket 44 when the backside of the head 66 engages the forward face 50. A retainer 74 is operatively secured to the second end of the shank 64. The retainer 74 can take different forms. In the illustrated examples, the retainer 74 is shown in the exemplary form of a threaded nut adapted to engage with screw threads 68, however this is but one option. In another contemplated embodiment, the retainer 74 could be C-clip and instead of threads 68 one or more ring-grooves are formed on the second end of the shank 64. In another contemplated embodiment, the retainer 74 could be push nut adapted to grip by barbed friction a smooth exterior of the second end of the shank 64. In a still further embodiment, the retainer 74 could be a cotter pin adapted to fit in one or more holes piercing the second end of the shank 64. Those of skill in the art will envision other methods to establish a secure retainer 74 onto the second end of the shank 64. Preferably, the retainer 74 includes a generally flat bearing surface on its forward-facing side or end. The flat bearing surface is presented perpendicular to the tooth axis B.

In examples of FIGS. 1-8, the retainer 74 is a nut threaded onto the screw threads 68 to secure the indexable tooth 62 in an operative condition in the holder 30. The nut 74 can be of any suitable type. In the illustrated examples, the nut 74 is of a self-locking type having a nylon insert 76 to resist unscrewing.

Figure 7:
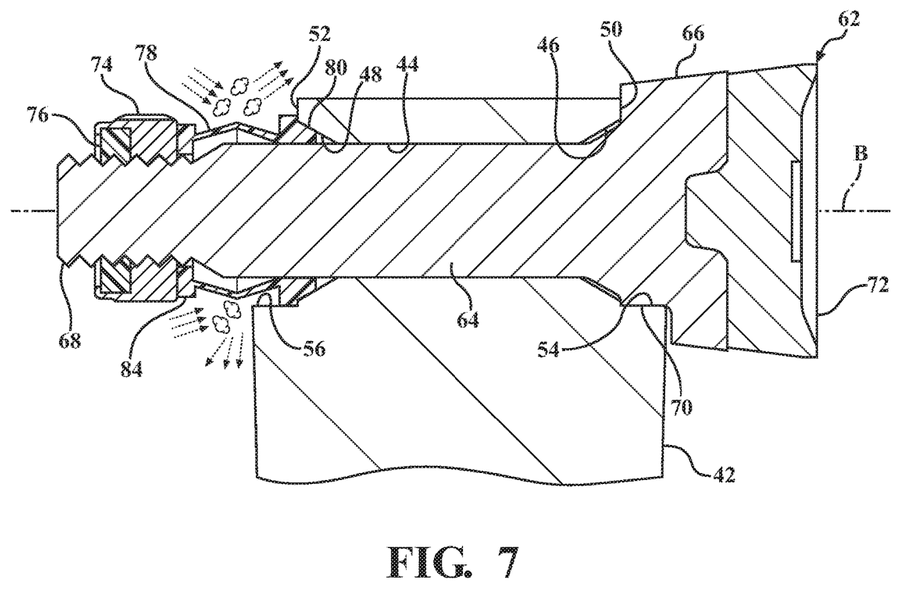
FIG. 7 is an enlarged fragmentary view showing the indexable tooth in an operational condition seated in the neck of the holder.

The assembly 20 includes a hermetic spring, generally indicated at 78. The hermetic spring 78 operatively disposed on the shank 64 between the retainer 74 and the rearward face 52 of the of the socket 44 for performing the biasing function while concurrently creating an airtight seal at the rearward side of the neck 42. The hermetic spring 78 is capable of blocking/excluding all fluids and granular debris. FIG. 7 graphically illustrates the protective nature of the hermetic spring 78, with debris being illustrated as tiny cloud-like elements. The debris can be particles of soil and wood dust, liquids like water, mud slurry, airborne contaminants, and the like. Any and all kinds of debris are repelled by the hermetic spring 78 and denied entrance into the socket 44 through the rearward opening 48. Moreover, the hermetic spring 78 actively sheds debris from accumulating in the region between retainer 74 and neck 42. In this way, there is little-to-no build-up of contaminates around the retainer 74.

In contrast, a traditional coil spring would enable fluid and granular contaminates to enter the socket 44, thus binding/seizing the shank 64 immovably in the holder 30 so that it resists indexing to expose a fresh cutting edge and/or replacement. Furthermore, dirt and solid particles will become impacted in-between the coils of a traditional compression spring, thus defeating its resiliency and effectively locking the tooth 62 in the socket 44. The hermetic spring 78 of the present invention suffers from none of the problems attributed to traditional coil springs.

The hermetic spring 78 is fabricated from an elastomeric material. An appropriately selected resilient, elastomeric material will have rubber-like properties, in that it will be able to compress under loading but regain its original shape when the load is removed. Suitable elastomeric materials can include both natural and synthetic rubbers, urethane, polybutadiene, silicone, and neoprene, just to name a few of the many possibilities. A suitable elastomeric material will have a wide working temperature that corresponds generally with year-round environmental conditions, perhaps in the range of about 0°-115° F., or at least ~20°-400° F. This range could be narrowed for applications restricted to specific climates or seasons. For example, certain hermetic springs 78 perhaps colored blue could be intended for extreme cold weather (i.e., Winter) use; certain hermetic springs 78 perhaps colored green could be intended for mid-range weather (i.e., Spring-Fall) use; and certain hermetic springs 78 perhaps colored red could be intended for extreme hot weather (i.e., Summer) use. Naturally, many possibilities exit. Other important factors in the selection of a suitable elastomeric material can include hardness vs. softness, ageing resistance, abrasion resistance, chemical resistance, etc.

Figure 8:
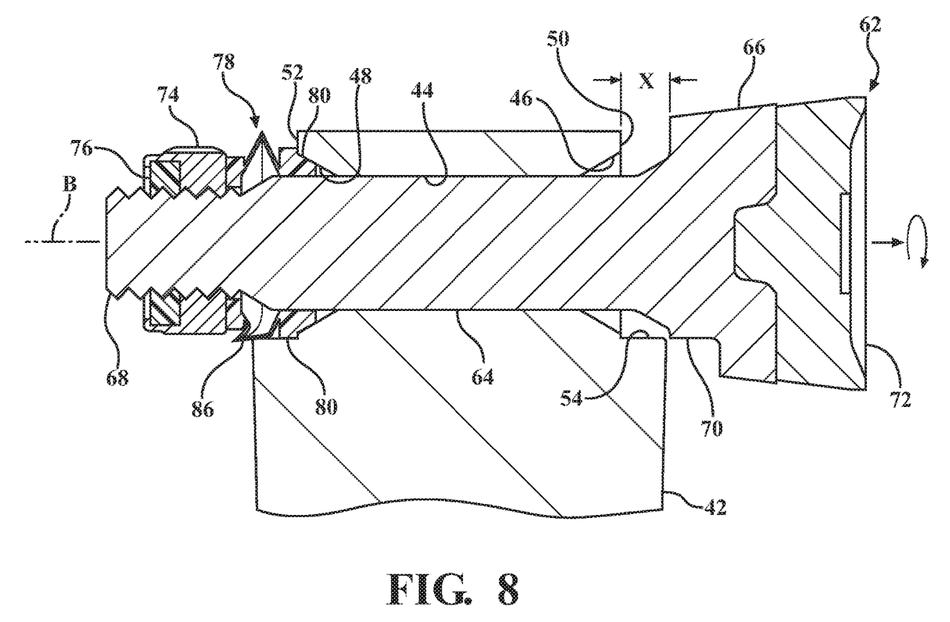
FIG. 8 is a view as in FIG. 7 but showing the tooth undergoing an indexing operation in which the head is disengaged from the neck and fractionally rotated.
Figure 9:
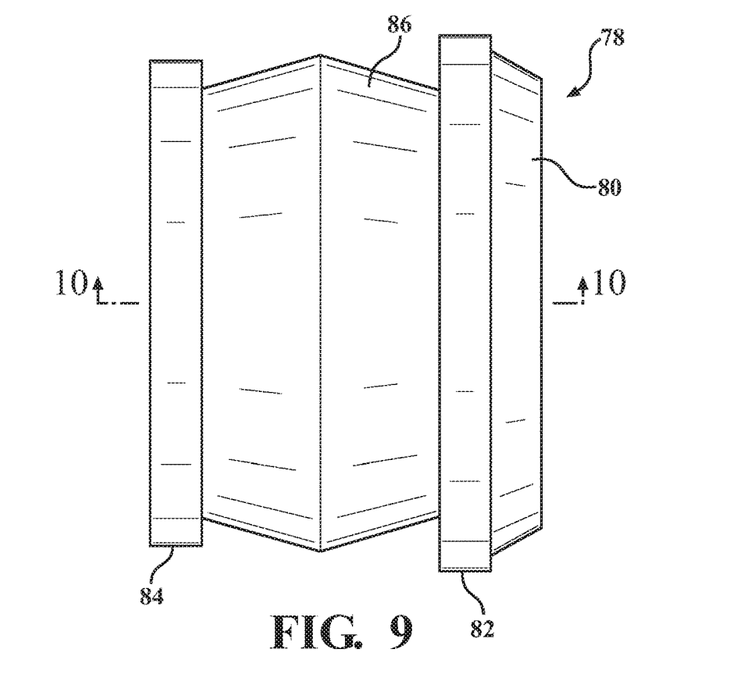
FIG. 9 is a side elevation view of a hermetic spring according to an embodiment of the invention.

FIGS. 9-12 display an exemplary hermetic spring 78 from various perspectives. In these examples, the hermetic spring 78 is shown having a nose 80. The nose 80 is shaped with a tapered point so that it will self-seat in the countersink at the rearward opening 48 of the socket 44. A flange 82 surrounds the tapered point feature of the nose 80. As best seen in FIGS. 7 and 8, the flange 84 directly abuts the rearward face 52 of the neck 42, both establishing a limit of penetration and also perfecting a seal aided by the compression of the hermetic spring 78. Thus, a fluid tight seal is perfected by the interface of tapered nose 80 pressed into the countersink rearward opening 48, combined with the interface of flange 82 pressed against the rearward face 52. At least the flange 82 is full circular (i.e., without gaps), but preferably both nose 80 and flange 82 are without gaps through which debris could infiltrate the hermetic spring 78.

Figure 10:
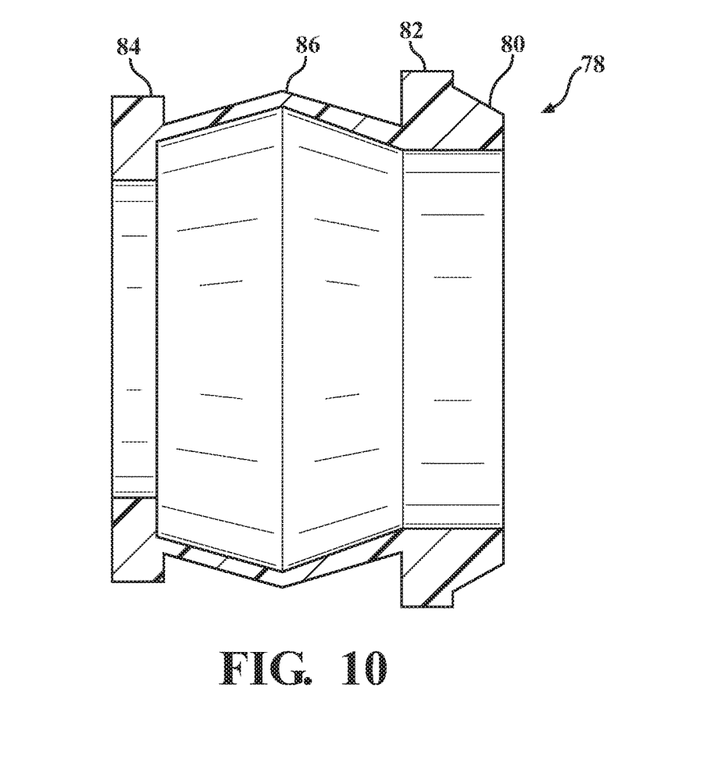
FIG. 10 is a cross-sectional view taken generally along lines 10-10 of FIG. 9.
Figure 11:
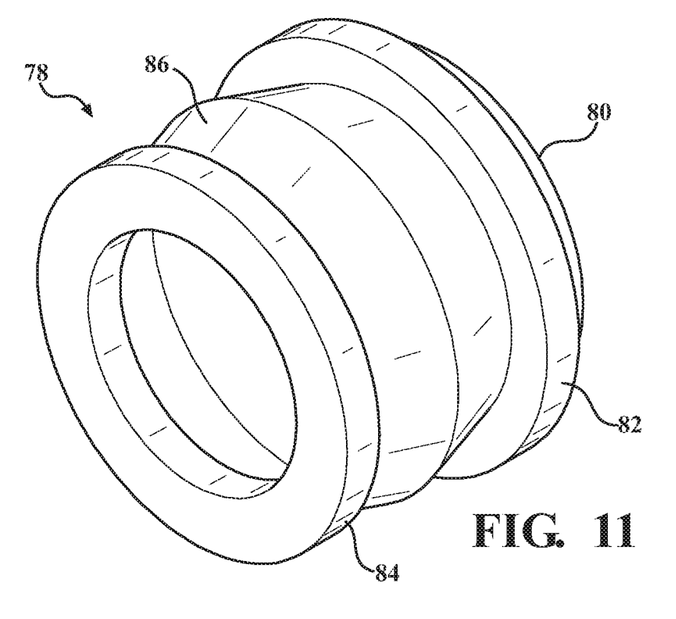
FIG. 11 is a perspective view of the hermetic spring highlighting its foot.
Figure 12:
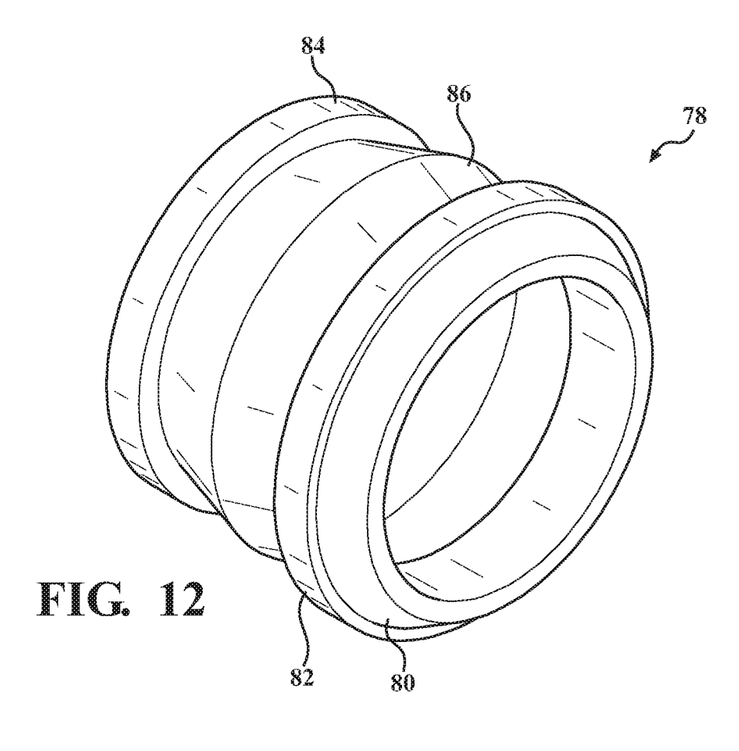
FIG. 12 is a different perspective view of the hermetic spring highlighting its nose.

Returning to FIGS. 9-12, the hermetic spring 78 is shown including a ring-like foot 84 opposite the nose 80. The foot 84 is full circular (i.e., unbroken) and adapted to engage the flat forward-facing bearing surface of the retainer 74. A fluid tight seal is perfected by the squared interface of foot 84 pressed against the bearing surface of the retainer 74, aided by the compressive force of the loaded hermetic spring 78. The inside diameter at the foot 84 may be different than the inside diameter at the nose 80. In the example of FIG. 10, the inside diameter at the foot 84 is noticeably smaller than at the nose 80. This may be done to better fit the indexable tooth 62. As shown in FIGS. 7 and 8 (as well as in the alternative embodiment of FIGS. 13-14), the slightly larger inside diameter at the nose 80 fits with a sliding interface to the smooth outer surface of the shank 64. Similarly, the slightly smaller inside diameter at the foot 84 fits with a tighter fit at the threaded end 68. It will be noticed that there will be no relative movement between the foot 84 and threaded end 68, thus a generous sliding fit is not necessary.

Even so, the major diameter of threads 68 may be smaller than the outside diameter of the shank 64. However, the inside diameter of the nose 80 must accommodate relative sliding movement of the shank 64, which may in fact be slightly larger than the major diameter of threads 68. These factors thus indicate that the inside diameter at the foot 84 may be larger than the inside diameter at the nose 80.

Figure 13:
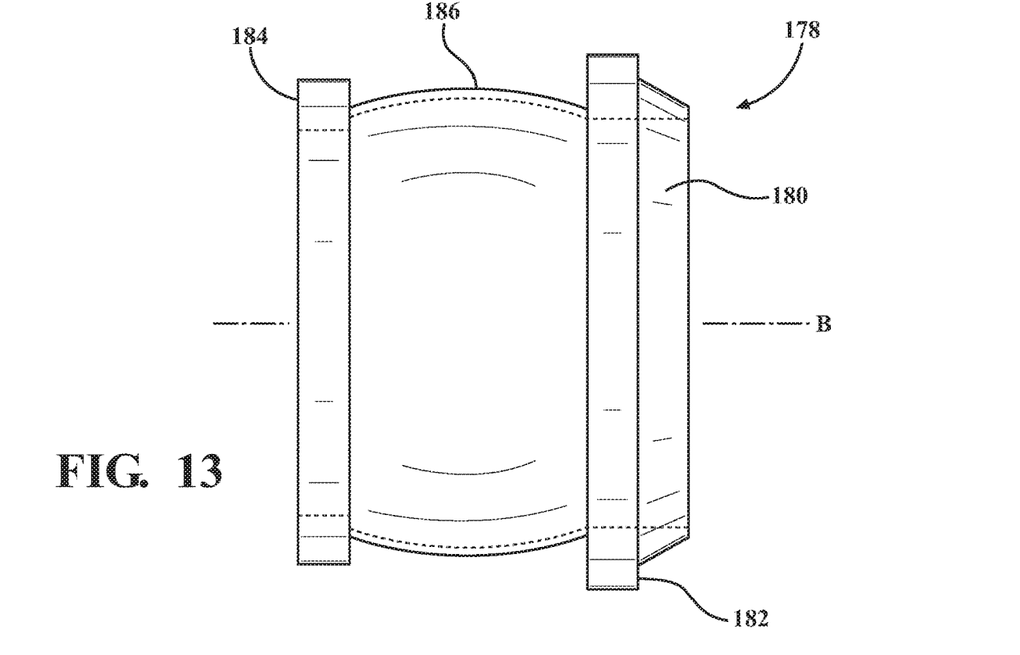
FIG. 13 is a side elevation view of a hermetic spring according to an alternative embodiment of the invention.
Figure 14:
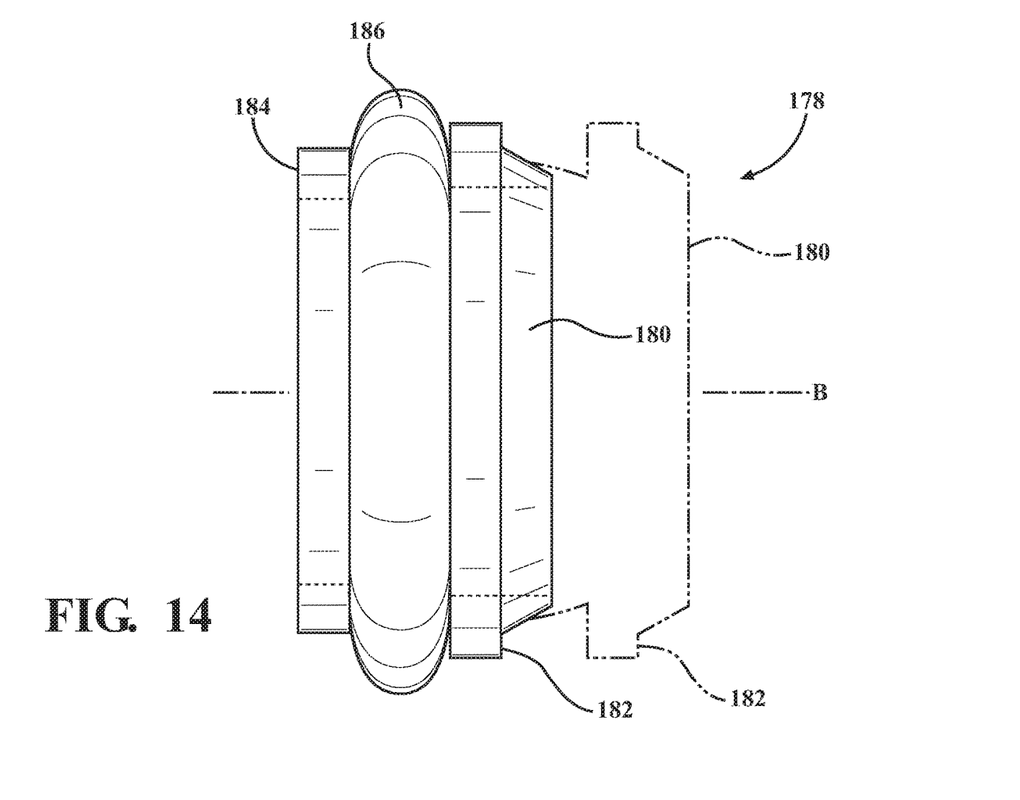
FIG. 14 is a side elevation view of the hermetic spring of FIG. 13 showing the spring compressed as during an indexing operation.

A bellows section 86 is disposed between the nose 80 and the foot 84. The bellows section 86 can take many different forms. In the illustrated examples, the bellows section 86 has the shape of an accordion-like body of revolution, with one central annular bulge or ridge. That is, a single convex coil or ridge establishes a natural central outward flex point when compressed. Although the central annular bulge or ridge is sharply peaked in the example of FIGS. 2-12, it could instead be rounded as per the example of FIGS. 13-14. In FIGS. 13-14, the previously established reference numbers are used with a "1" prefix. That is, the hermetic spring 178 includes a nose 180, a flange 182, a foot 184 and a bellows section 186. The tooth axis B is indicated in FIGS. 13-14 for correlation when installed in an operative condition with the other components of an indexable tooth.

It has been discovered that a single convex annular ridge or bulge in the bellows section 86, 186 will naturally shed contamination because, as all times (i.e., whether relaxed or compressed) the centrally-peaked feature will naturally avoid the formation of debris-trapping crevasses. Said another way, the sole protruding annular ridge or bulge behaves akin to a peaked roof causing liquids and debris to fall toward the respective flange 82, 182 and foot 84, 184 ends. If debris cakes around the hermetic seal 78, 178 through stump grinding use, the expanding central annular ridge or bulge of the bellows section 86, 186 will naturally break apart the surrounding dirt when the indexable tooth 62 is pulled to the position of FIG. 8 for indexing. By comparing FIGS. 7-8 and also FIGS. 13-14, it will be observed that the central annular ridge or bulge of the bellows section 86, 186 expands when it is compressed. Indeed, substantially the entirety of the bellows section 86, 186 flexes outward upon compression. This is by design, so that any fetter-like surround of debris accumulated around the rearward side of the neck 42 will be burst apart by the swelling action of the hermetic spring 78, 178.

As a direct result, the indexable tooth 62 can be indexed quickly over an extended service life. Given the relatively short space available for most tree stump grinding applications, this truncated shape has been found more than adequate. In another contemplated example, the bellows section 86 retains the accordion-like body of revolution shape but is fashioned with a plurality of ridges and valleys akin to the flex pipe design commonly found in rubber hoses and the like. In a further contemplated example, the bellows section 86 is not a body of revolution but rather takes a spiral shape akin to the ubiquitous spiral flex ducts commonly found in air handling applications. In a still further contemplated example, the bellows section 86 takes a braided shape akin to the well-known braided flex hoses found in many automotive and aircraft fluid-handling applications. In all these various configurations, the bellows section 86 will remain capable of blocking/excluding all fluids and granular debris. All kinds of debris are repelled by the bellows section 86 and denied pass-through the hermetic spring 78.

In use, the hermetic spring 78 can be used with an indexable tooth 62 having a suitably long shank 64. Assembly of the several components occurs as per FIGS. 3 and 4. The tooth 62 is fully inserted into the socket 44 so that one of its flats 70 nests or registers with the forward shoulder 54. After the hermetic spring 78 is installed, the retainer 74 is secured onto the second end of the shank 64 so as to partially compress or load the hermetic spring 78. The goal is to slightly compress the hermetic spring 78 so that robust seals are establish at the nose 80 and foot 84 ends, resulting in the operative condition shown in FIG. 7. The wheel assembly 20 is ready for use in the field when indexable teeth 62 are properly installed in each holder 30, similar to that shown in FIG. 1.

After a period of use in service, the affected portions of the edges the cutting tips 72 of each tooth 62 will become dull. Typically, the affected portions span about 25-35% of the circumference of each cutting tip 72. In order to improve cutting efficiency, each tooth 62 can be rotationally indexed to expose a fresh portion of its cutting edge. This is accomplished by manually pulling the head 66 (and/or pushing of the opposite end of the shank 64), causing hermetic spring 78 to yield, as shown in FIG. 8. Axial displacement "X" of the indexable tooth 62 must be sufficient to bring the flats 70 out of registry with the forward shoulder 54. Then while tension is maintained, the indexable tooth 62 is rotated, right or left, to bring a different flat 70 into registry with the forward shoulder 54. Tension is released, allowing the biasing action of the hermetic spring 78 to return the indexable tooth 62 to the operational position of FIG. 7.

It will be appreciated that the indexing operation just described can be accomplished in a few seconds and typically without the aid of tools. The example of FIG. 1 portrays a wheel assembly 20 having thirty teeth 62 (fifteen on each of the left and right sides). If it is estimated that the average person of skill in this art can index each tooth in ~5-10 seconds, the indexing operation for the entire wheel assembly can be completed in 5 minutes or less. This rapid maintenance program enabled by the present invention compares favorably to the prior art requirement in which the backing nut had to be loosened and re-tightened with a wrench. If one estimates that the person of ordinary skill needed 30-60 seconds to index each tooth, the indexing operation for a thirty-tooth wheel assembly would require about 15-30 minutes. The time savings are substantial. Moreover, the tooth 62 of this invention can indexed using only one hand. In contrast, the prior art method of indexing teeth required the use of two hands (or some special accommodation for the re-tightening process). Thus, the present invention is more user friendly, particularly with regard to a worker having an injured or possibly disabled hand. Furthermore, the fact that the tooth 62 of this invention can be indexed without tools, means that indexing between planned maintenance cycles can be accomplished as needed. Thus, if a cutting tip 72 chips unexpected in the midst of a grinding operation, the user can quickly and without tools rotationally index the tooth 62 to expose a fresh (or at least better) cutting edge.

The fully closed hermetic spring 78 is resistant to contamination from debris. The shape of the hermetic spring 78 can take many different forms. A distinct advantage of the illustrated embodiment having a single convex annular ridge, is that it naturally sheds contamination due to the avoidance of debris-trapping crevasses. As a direct result, the indexable tooth 62 is less likely to be affected by caked debris, enabling convenient indexing whenever needed over an extended service life. And conveniently, the indexable tooth 62 can be configured for retrofit installation into a traditional style tool holder 30 like that depicted in FIGS. 2-4.

The foregoing invention has been described in accordance with the relevant legal standards. Thus the description is exemplary rather than limiting in nature. Variations and modifications to the disclosed embodiment may become apparent to those skilled in the art and fall within the scope of the invention.

What is claimed is:

1. An indexable cutting tooth assembly for tree stump grinding, said assembly comprising:
    a shank and having first and second ends, a head attached to said first end of said shank, said head including cutting tip,
    a retainer operatively secured to said second end of said shank, and
    a hermetic spring operatively disposed on said shank between said retainer and said head, said hermetic spring being fabricated from an elastomeric material, wherein said hermetic spring has a nose, said nose comprising a tapered point which forms a fluid tight seal with a holder.

2. The assembly of claim 1, wherein said nose includes a flange surrounding said tapered point.

3. The assembly of claim 1, wherein said hermetic spring has an annular foot, a bellows section disposed between said nose and said foot.

4. The assembly of claim 3, wherein said bellows section has the shape of a body of revolution.

5. The assembly of claim 3, wherein said bellows section having a central annular bulge.

6. The assembly of claim 3, wherein said head has a at least one flat, said cutting tip fabricated from a carbide material and having a circular periphery, said retainer including a generally flat bearing surface, and said retainer comprising a threaded nut having a nylon insert.

7. An indexable tooth and holder assembly for a tree stump grinding wheel, said assembly comprising:
    a holder having a base and a neck extending from said base, said neck having a distal end spaced from said base, said distal end including a socket extending cylindrically along a tooth axis, said socket having a forward opening and a rearward opening, said distal end of said neck having a forward face and a rearward face, said distal end of said neck having a forward shoulder associated with said forward face,
    an indexable tooth having a shank slidably received in said socket, said shank having first and second ends, a head attached to said first end of said shank, said head protruding from said forward face of said socket, said second end protruding from said rearward face of said socket, said head having at least one flat configured to register with said forward shoulder, said head including cutting tip,
    a retainer operatively secured to said second end of said shank, and
    a hermetic spring operatively disposed on said shank between said retainer and said rearward face of said of said socket,
    wherein said rearward opening of said socket is formed with a countersink, said hermetic spring having a nose, said nose including a tapered point seated in said countersink at said rearward opening of said socket which forms a fluid tight seal with said holder.

8. The assembly of claim 7, wherein said hermetic spring is fabricated from an elastomeric material.

9. The assembly of claim 7, wherein said nose includes a flange surrounding said tapered point.

10. The assembly of claim 7, wherein said retainer includes a generally flat bearing surface, said hermetic spring having a foot adapted to engage said bearing surface of said retainer, a bellows section disposed between said nose and said foot.

11. The assembly of claim 10, wherein said bellows section has the shape of a body of revolution.

12. The assembly of claim 10, wherein said bellows section has a central annular bulge.

13. The assembly of claim 7, wherein said forward face and said rearward face are disposed perpendicular to said tooth axis, said forward shoulder perpendicularly adjoining said forward face.

14. The assembly of claim 7, wherein said head includes three said flats arranged in an equilateral triangular pattern, said cutting tip fabricated from a carbide material, said cutting tip having a circular periphery, said cutting tip having a concave face, said nut including a generally flat bearing surface, and said retainer comprising a threaded nut having a nylon insert.

15. A tree stump grinding wheel assembly comprising:
    a rotor having a cutting periphery, a plurality of holders distributed about said cutting periphery of said rotor, each holder having a base and a neck extending from said base, said neck having a distal end spaced from said base, said distal end including a socket extending cylindrically along a tooth axis, said socket having a forward opening and a rearward opening, said distal end of said neck having a forward face and a rearward face, said forward face and said rearward face disposed perpendicular to said tooth axis, said distal end of said neck having a forward shoulder,
    an indexable tooth disposed in each holder, said indexable tooth having a shank slidably received in said socket in said distal end of said neck, said shank having first and second ends, a head attached to said first end of said shank, said head protruding from said forward face of said socket, said second end protruding from said rearward face of said socket, said head having at least one flat configured to register with said forward shoulder, said head including cutting tip,
    a retainer operatively secured to said second end of said shank, and
    a hermetic spring operatively disposed on said shank between said retainer and said rearward face of said of said socket,
    wherein said rearward opening of said socket is formed with a countersink, said hermetic spring having a nose, said nose including a tapered point seated in said countersink at said rearward opening of said socket which forms a fluid tight seal with said holder.

16. The assembly of claim 15, wherein said hermetic spring is fabricated from an elastomeric material.

17. The assembly of claim 16, wherein said retainer includes a generally flat bearing surface, said nose including a flange surrounding said tapered point, said hermetic spring having a foot adapted to engage said bearing surface of said retainer, a bellows section disposed between said nose and said foot, said bellows section having a central annular bulge.

* * * * *